Jan. 28, 1947.  L. E. HARDING  2,414,870
FASTENING DEVICE
Filed Sept. 14, 1943  2 Sheets-Sheet 1

INVENTOR
LLOYD E. HARDING
BY
William A. Jalesak
ATTORNEY

Jan. 28, 1947.   L. E. HARDING   2,414,870
FASTENING DEVICE
Filed Sept. 14, 1943   2 Sheets-Sheet 2

INVENTOR
LLOYD E. HARDING
BY
William A. Zalesak
ATTORNEY

Patented Jan. 28, 1947

2,414,870

UNITED STATES PATENT OFFICE 2,414,870

FASTENING DEVICE

Lloyd E. Harding, Bradley Beach, N. J., assignor of one-fifth to Edmund J. Lada, Woodhaven, N. Y., and one-fifth to William A. Zalesak, Union, N. J.

Application September 14, 1943, Serial No. 502,243

15 Claims. (Cl. 151—22)

My invention relates to fastening devices, such as screws and bolts, more particularly to self-locking screws and bolts of improved design.

In equipment subjected to vibration, the conventional screw or bolt is readily loosened unless some locking means is employed. Normally locking washers or special forms of lock nuts are used. It is, of course, obvious that in cases where a structure is tapped or threaded to receive the screw or bolt, special lock nuts cannot be used. The use of a washer adds an extra part, increases the weight of the equipment and also the time of assembly. This also involves added expense. In cases where the screw or bolt is exposed to contact with oil, oil film on the bolts or screws makes them liable to become more easily loosened. In the case where washers are used it is essential that the screw or bolt be brought up tight against the washer to insure a locking action. It is not possible to lock the screw or bolt intermediate its ends so as to permit rotation relative to the screw or bolt in those portions of the equipment clamped between the head of the screw or bolt and the fixed portion of the apparatus with which the screw or bolt is used.

It is an object of my invention to provide a screw or bolt of the self-locking type.

Another object of my invention is to provide a screw or bolt which eliminates the use of a screw or washer or special nut, thereby reducing cost and assembly time as well as reducing overall weight.

A further object of my invention is to provide such a device which may be utilized in tapped or threaded holes of conventional or standard size.

A still further object of my invention is to provide such a screw or bolt which avoids the hazards of loosening due to oil film.

Another object of my invention is to provide a screw or bolt which may be repeatedly used.

A still further object of my invention is to provide such a bolt which provides its own stop or lock nut action.

A further object of my invention is to provide such a screw or bolt in which the locking action may be made to take place along any portion of the screw or bolt.

Figure 1:
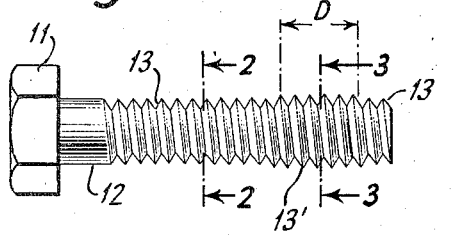
Figure 2:
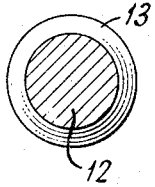
Figure 3:
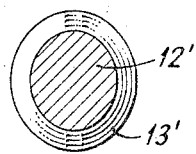
Figure 5:
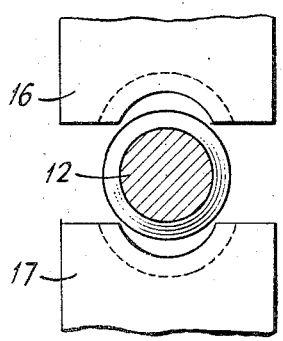
Figure 6:
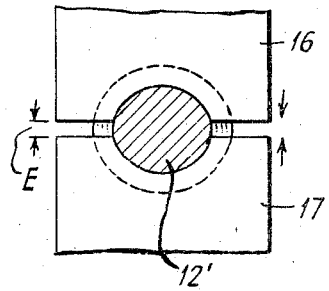
Figure 4:
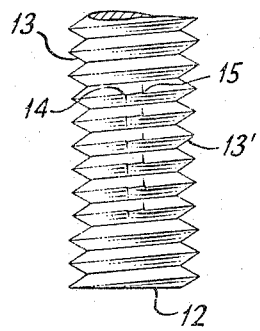
Figure 7:
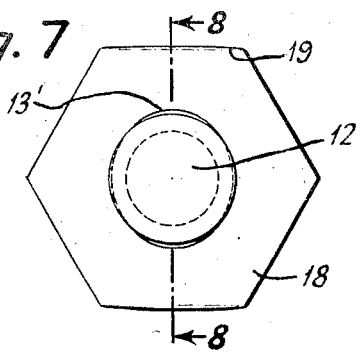
Figure 8:
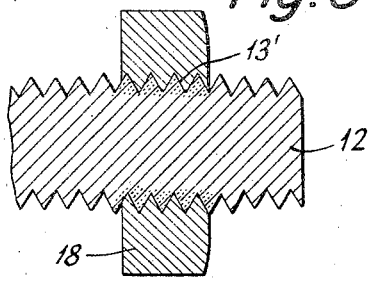
Figure 9:
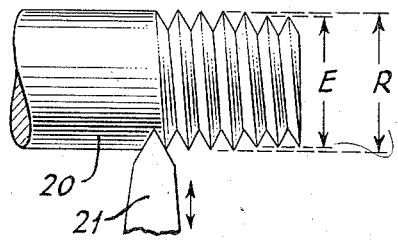
Figure 10:
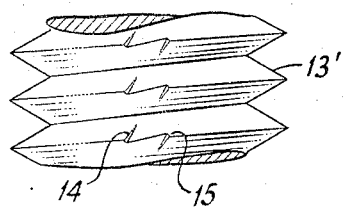
Figure 11:
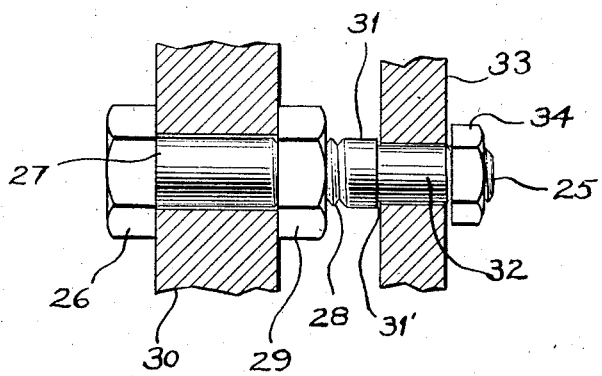

The novel features which I believe to be characteristic of my invention are set forth with particularity in the appended claims, but the invention itself will best be understood by reference to the following description taken in connection with the accompanying drawings in which Figure 1 is a longitudinal side view of a screw or bolt made according to my invention, Figures 2 and 3 are sections taken along the lines 2—2 and 3—3 of Figure 1, Figure 4 is an enlarged view of the threaded portion of a screw or bolt made according to my invention, Figures 5 and 6 show steps in the formation of a screw or bolt made according to my invention, Figures 7 and 8 illustrate the principles involved in connection with a screw or bolt made according to my invention, Figure 9 shows a modification of a screw or bolt made according to my invention and the method of manufacture, Figure 10 is an enlarged detail of the screw threads when made according to my invention, and Figure 11 shows a further application of my invention.

Referring to Figure 1, a screw or bolt made according to my invention includes a head 11 and a shank or core 12 threaded as shown. The threads 13 are conventional threads made in the usual way whereas the threads 13' included in the portion of the screw or bolt throughout the length indicated by D are made according to my invention. The sections shown in Figures 2 and 3 show the form of screw or bolt at the portions 2—2 and 3—3 of Figure 1, the portion 3—3 showing the cross section at that portion of the screw made according to my invention. As best shown in Figures 4 and 10, the thread is deformed by subjecting it to a compressive action in a manner to be described, such that a portion of the thread indicated at 13' is displaced laterally with respect to the remainder of the thread so that the thread is displaced at two points, the sections 13' being on opposite sides of the screw and 180° displaced from each other. This portion of the shank or core may also be deformed to an oval or elliptical cross section as shown in Figure 3, if sufficient pressure is used.

The method of obtaining this deformation in accordance with my invention is illustrated in Figures 5 and 6. A die comprising two sections 16 and 17 having the same threads per inch and the same diameter as the normal portion 13 of the screw is so designed that a small segment represented by the portion marked E in Figure 6 is removed from the die so that when the die is closed an elliptical shape is produced in the threaded aperture within the die. The threaded portion of the screw where it is desired to incorporate threads made according to my invention is subjected to pressure between the two halves of the die. As a result the threaded portions 13 of the screw assume the form shown at 13' in Figures 4 and 10. As best shown in Figure 10 a part 14 of the thread is displaced laterally in one direction and part of the thread 15 is displaced laterally in the opposite direction to produce a break in the thread 13'. The portion of the thread between displaced portions 14 and 15 appears to be rotated out of line with the remainder of the thread. If subjected to sufficient pressure the core or shank of the screw is made to assume a more or less elliptical shape as shown at 12' in Figure 3.

When this screw is inserted in the conventional nut, for example, and screwed up until the portion made according to my invention and having an elliptical shape is received within the nut, it subjects the nut 18 to transverse stresses so that the nut tends to elongate along the plane 8—8 to increase the width of the nut by a slight amount indicated by the exaggerated displacement 19 as indicated by the dotted lines.

As shown in Figure 8, which is taken along the line 8—8 of Figure 7, the threads are subjected to pressure stress by the nut which in turn is also placed under tensile stress. This of course increases the pressure between the nut and the screw so that there is no tendency for the nut to be displaced by vibration. While I do not wish to be limited by the following theory, I believe that the displaced portions 14 and 15 bear upon the threaded portion of the nut or a tapped and threaded hole so as to resist turning movement due to whatever biting and wedging action may take place between the edges 14 and 15 of the displaced thread on the screw or bolt and the threaded portion of the receiving aperture. In actual tests on a screw of less than ¼ inch diameter, where 8000 pounds pressure per square inch was used on the dies during formation of a thread made according to my invention, a torque of 1½ foot pounds was necessary to release the screw and in actual vibration tests parts of the equipment gave way before any relative rotation of the screw with respect to the equipment could be detected.

Deformation of the screw thread alone is sufficient to produce the locking action required. However, deformation of the body of the screw or bolt to an elliptical or oval section increases the effectiveness of the screw or bolt made according to my invention.

In Figure 9 is shown a modification of the screw or bolt made according to my invention and which produces the results described above. In this form the screw or bolt may have an intermediate portion of elliptical or oval section. The threads are not deformed laterally along short portions, but are applied in the conventional way by having the threading tool move in and out by cams or other mechanical methods during threading of the elliptical portion so that the depth of thread along all portions of the screw or bolt is constant. In this form the increased friction between the screw or bolt and the nut or tapped hole into which it is inserted is sufficient to retain the screw in place against vibration. The threads within the dimension E are on the round parts of the shank and within the dimension R on the elliptical part of the shank, the diameter of the round part being equal to the small dimension of the elliptical part. Thus while the pitch is substantially the same the angle of the thread with respect to the longitudinal axis of the screw changes, so that there is a slight mismatch of threads on the screw and the tapped aperture.

In connection with the dies shown in Figures 5 and 6, if the die thread pitch is slightly larger than the screw thread, no sharp transverse displacement or break of the thread results when the dies are closed and much the same thread formation may be produced as in the case of the device shown in Figure 9 where the oval portion is provided intermediate the ends of the screw with a constant depth of thread.

In Figure 11 is shown another application of my invention. A bolt 25 is provided with a head 26, the shank having the portion 27 unthreaded and a portion 28 threaded in accordance with my invention and engaged by a nut 29 for maintaining the bolt, which acts as a stud, firmly in position on supporting member 30. The shank is reduced in diameter at 31 to permit passage of the nut 29 thereover and to provide a shoulder 31' for the reduced portion 32 of still smaller diameter, upon which the member 33 may be rotatably supported, a nut 34 being engaged with the end of the bolt which is also threaded in accordance with my invention. Thus the nuts may be locked in place without the use of lock washers, the clearance between the rotatable member 33 and the shoulder 31' and nut 34 being determined by the desired ease of rotation of member 33. Thus in accordance with my invention I provide two modes of fastening, one which prevents rotation, that is that portion between the head 26 and the nut 29 and that portion which permits rotation, that is between the portion 31 and the nut 32.

While I have indicated the preferred embodiments of my invention of which I am now aware and have also indicated only one specific application for which my invention may be employed, it will be apparent that my invention is by no means limited to the exact forms illustrated or the use indicated, but that many variations may be made in the particular structure used and the purpose for which it is employed without departing from the scope of my invention as set forth in the appended claims.

What I claim as new is:

1. A fastening device having an elongated body, said body being threaded, a plurality of threads intermediate the ends of said body having twisted portions opposite ends of which are displaced laterally whereby lateral projections are formed along the threads, said laterally displaced portions of each thread being adjacent each other along the thread and displaced in two opposite directions for providing a wedge action when received within a tapped and threaded opening.

2. A fastening device having an elongated body, said body having an intermediate portion of oval shape, said body being threaded along its length, a plurality of said threads at the oval intermediate portion having portions displaced laterally whereby lateral projections are formed along the length of said threads.

3. A fastening device having an elongated body, said body having an intermediate portion of oval shape, said body being threaded along its length, a plurality of said threads at the oval intermediate portion having portions displaced laterally whereby lateral projections are formed along the length of said threads, the displaced portions being displaced in two directions for providing a wedge fit when received within a threaded aperture.

4. The method of making a self-locking fastening device having a threaded elongated body including subjecting the threads intermediate the ends of said elongated body to the action of a two-part die, said die having threads registering with the threads on said body in initial contact with said threads but providing an elliptical opening when the parts of the two-part die are forced toward but not into contact relationship.

5. A method of making a self-locking fastening member which comprises forming a device having a head and a shank, forming said shank to have intermediate round and elliptical sections and threading said shank with a thread having a constant pitch and depth of thread by moving a threading tool along a surface conforming to the surface of said shank.

6. A fastening device having a head and a shank, said shank having alternate transverse sections of round and elliptical shape, said shank being threaded along its length, a plurality of said threads on the elliptical portions of said shank having portions displaced laterally to provide lateral projections along the length of said threads.

7. A fastening device having a head and a shank, said shank having alternate transverse sections of round and elliptical shape, said shank being threaded along its length, a plurality of said threads on the elliptical portions of said shank having portions displaced laterally to provide lateral projections along the length of said threads, the displaced portions of said threads having their ends displaced in opposite directions.

8. A fastening device having a head and a shank, said shank being threaded, a plurality of adjacent threads along said shank intermediate the ends of the shank having twisted portions opposite ends of which are displaced laterally of the thread to provide lateral projections along the thread, the displaced portions of each thread being positioned adjacent each other along the thread and at opposite sides of the thread.

9. A fastening device having a head and a shank, said shank being threaded, one of the threads being provided with an intermediate portion rotated about the center of said portion out of line with the remainder of the thread to provide a double wedge action with a cooperating nut.

10. A fastening device having an elongated body, said body being threaded, one of the threads being provided with an intermediate portion rotated about its center out of line with the remainder of the thread to provide a wedge action with a cooperating nut, the ends of said rotated portion providing sharp breaks in the thread.

11. A fastening device having a head and a shank, said shank being provided with portions of different diameters, an intermediate portion of said shank on one diameter being threaded, at least one of the threads on said intermediate portion having a portion displaced laterally of the thread.

12. A fastening device having a head and a shank, said shank being provided with portions of different diameters, an intermediate portion of said shank on one diameter being threaded, at least one of the threads on the intermediate portion having a portion displaced laterally of the thread, the end of said shank opposite said head also being provided with threads, at least one of said last mentioned threads having an intermediate portion displaced laterally of the thread.

13. A fastening device having a head and a shank, said shank being provided with portions of different diameters, an intermediate portion of said shank on one of the diameters being threaded, at least one of said threads on said intermediate portion having a portion displaced laterally of the thread, the ends of the displaced portion being displaced in opposite directions, the end of said shank also being provided with threads, at least one of said last mentioned threads having an intermediate portion displaced laterally of the thread, the ends of the displaced portion being displaced in opposite directions.

14. The method of making a self-locking device having an elongated body portion including the steps of threading said body portion, rotating a portion of a thread about an axis transverse to the longitudinal axis of said body by subjecting said body portion to compression by a die, whereby oppositely directed adjacent projections are formed in the thread.

15. The method of making a self-locking fastening device having an elongated body and including threading said body along its length, displacing portions of some of the threads in opposite directions from the line of the thread by subjecting said elongated body to compression by a die, said displaced portions lying along the thread and closely adjacent each other to provide oppositely disposed projections.

LLOYD E. HARDING.